(12) United States Patent
Jaradi et al.

(10) Patent No.: US 10,391,968 B2
(45) Date of Patent: Aug. 27, 2019

(54) AIRBAG ASSEMBLY INCLUDING INTERNAL AND EXTERNAL TETHERS

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US); James Chih Cheng, Troy, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 15/299,614

(22) Filed: Oct. 21, 2016

(65) Prior Publication Data

US 2018/0111583 A1   Apr. 26, 2018

(51) Int. Cl.
  *B60R 21/2338*  (2011.01)
  *B60R 21/231*   (2011.01)
  (Continued)

(52) U.S. Cl.
  CPC ........ *B60R 21/2338* (2013.01); *B60R 21/231* (2013.01); *B60R 21/233* (2013.01);
  (Continued)

(58) Field of Classification Search
  CPC . B60R 21/2338; B60R 21/233; B60R 21/231; B60R 21/205; B60R 2021/23308; B60R 2021/23382; B60R 2021/23386
  (Continued)

(56) References Cited

U.S. PATENT DOCUMENTS

| 9,205,798 | B1 | 12/2015 | Jindal et al. |
| 9,248,799 | B2 | 2/2016  | Schneider et al. |
| 9,340,176 | B2 | 5/2016  | Belwafa et al. |
| 9,376,084 | B2 | 6/2016  | Choi et al. |

(Continued)

FOREIGN PATENT DOCUMENTS

| CN | 1824549 A   | 8/2006 |
| EP | 2599669 A1  | 6/2013 |

(Continued)

OTHER PUBLICATIONS

Search Report from the United Kingdom Intellectual Property Office dated Mar. 28, 2018 regarding GB Application No. GB1716838.6 (3 pages).

*Primary Examiner* — Keith J Frisby
(74) *Attorney, Agent, or Firm* — Frank A. MacKenzie; Bejin Bieneman PLC

(57) ABSTRACT

An airbag assembly includes a base, an airbag supported by the base and defining an inflation chamber, an external tether, and an internal tether. The airbag includes a panel and an extension extending transverse to the panel. The panel includes an internal surface facing the inflation chamber and an external surface facing away from the inflation chamber. The external tether extends from the extension to the external surface of the panel. The internal tether extends from the base to the internal surface of the panel. During a vehicle impact, the momentum of the occupant may move the occupant towards the extension. The extension may absorb energy from the occupant and reduce or prevent the head of the occupant from sliding across the panel and/or rotating.

16 Claims, 6 Drawing Sheets

(51) Int. Cl.
  *B60R 21/205* (2011.01)
  *B60R 21/235* (2006.01)
  *B60R 21/233* (2006.01)

(52) U.S. Cl.
  CPC .......... *B60R 21/235* (2013.01); *B60R 21/205* (2013.01); *B60R 2021/23153* (2013.01); *B60R 2021/23308* (2013.01); *B60R 2021/23382* (2013.01); *B60R 2021/23386* (2013.01); *B60R 2021/23509* (2013.01)

(58) Field of Classification Search
  USPC .......................... 280/732, 729, 730.1, 743.2
  See application file for complete search history.

(56) References Cited

U.S. PATENT DOCUMENTS

| | | | |
|---|---|---|---|
| 9,789,842 | B2 * | 10/2017 | Shin .................... B60R 21/2176 |
| 2007/0108753 | A1 * | 5/2007 | Pang .................... B60R 21/231 |
| | | | 280/743.2 |
| 2007/0262570 | A1 | 11/2007 | Choi |
| 2008/0122205 | A1 | 10/2008 | Holloway et al. |
| 2008/0296875 | A1 * | 12/2008 | Aho ................. B60R 21/23138 |
| | | | 280/729 |
| 2015/0197210 | A1 | 7/2015 | Abe |
| 2018/0029557 | A1 * | 2/2018 | Yamada .............. B60R 21/2338 |

FOREIGN PATENT DOCUMENTS

| | | |
|---|---|---|
| JP | 5363863 B2 | 12/2013 |
| KR | 101561468 B1 | 10/2015 |
| WO | WO 2015156088 A1 | 10/2015 |
| WO | WO 2016002384 A1 | 1/2016 |

* cited by examiner

AIRBAG ASSEMBLY INCLUDING INTERNAL AND EXTERNAL TETHERS

BACKGROUND

During a vehicle impact, occupants may move in a direction influenced by the momentum of the vehicle. Some vehicle impacts, e.g., side impact, frontal offset impacts, far side oblique impact, near side oblique impact, etc., may cause the occupants to move at an angle towards vehicle components, e.g., toward an A-pillar, hinge pillar, door, etc. In this situation, the momentum of the occupant may urge the head of the occupant to slide and/or rotate across a face of an inflated airbag.

DETAILED DESCRIPTION

Figure 1:
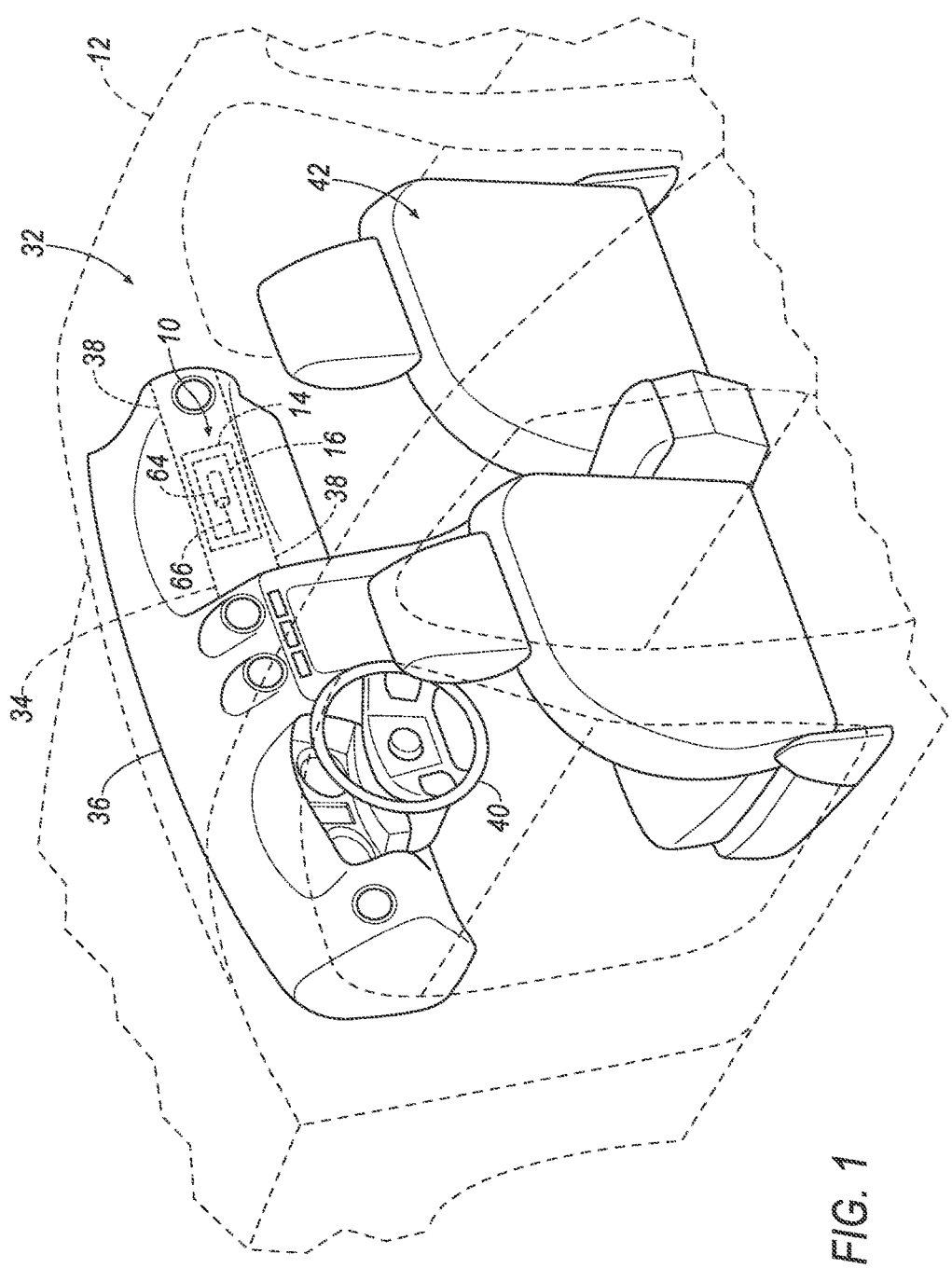
FIG. 1 is a perspective view of a vehicle including an airbag assembly supported by an instrument panel with an airbag in an uninflated position.

With reference to the Figures, wherein like numerals indicate like parts throughout the several views, an airbag assembly 10 for a vehicle 12 includes a base 14 and an airbag 16 supported by the base 14. The airbag 16 defines an inflation chamber 18. The airbag 16 includes a panel 20 and an extension 22 extending transverse to the panel 20. The panel 20 includes an internal surface 24 facing the inflation chamber 18 and an external surface 26 facing away from the inflation chamber 18. An external tether 28 extends from the extension 22 to the external surface 26 of the panel 20. An internal tether 30 extends from the base 14 to the internal surface of the panel 20.

During a vehicle impact, the airbag 16 may be inflatable from an uninflated position, as shown in FIG. 1, to an inflated position, as shown in FIGS. 2-6. During the vehicle impact, an occupant may be forced into the panel 20 and the extension 22 of the airbag 16 in the inflated position. Some vehicle impacts, e.g., side impact, frontal offset impacts, far side oblique impact, near side oblique impact, etc., may cause the occupants to move at an angle toward vehicle components, e.g., toward an A-pillar, hinge pillar, door, etc. During these types of impacts, the extensions 22 may slow or stop the head of the occupant from sliding across the airbag 16 to reduce the likelihood of the head of the occupant impacting components of the vehicle 12 or another occupant. In this situation, as the head of the occupant impacts the extension 22, the extension 22 may absorb the energy from the occupant. In other words, the extension 22 may catch the head of the occupant and retain the head of the occupant on the airbag 16. When the extension 22 catches the head of the occupant, the external tether 28 and the internal tether 30 may provide a counteracting force against the force of the head of the occupant on the extension 22 to assist in retaining the head of the occupant on the airbag 16. In other words, the external tether 28 and the internal tether 30 may assist in maintaining the extension 22 in the inflated position when the extension 22 is impacted by the head of the occupant. The extension 22 catches the head of the occupant to assist in limiting or preventing sliding of the head across the airbag 16 and/or head rotation after contact with the airbag 16, which may reduce head injury criteria (HIC) and/or brain injury criteria (BrIC).

The vehicle 12 may, for example, be any suitable type of automobile. The vehicle 12 may include a restraint system 32 including the airbag assembly 10 and a reaction surface 34 that supports the airbag assembly 10. The reaction surface 34 may be a rigid surface that supports the airbag assembly 10, and specifically, supports the airbag 16 when the airbag 16 is in the inflated position. The airbag assembly 10 may be mounted to the reaction surface 34, as set forth below. When the airbag 16 is in the inflated position, the reaction surface 34 may provide a counteracting force against the airbag 16 when the airbag 16 is impacted by the head of the occupant such that the airbag 16 is squeezed between the head of the occupant and the reaction surface 34.

Figure 2:
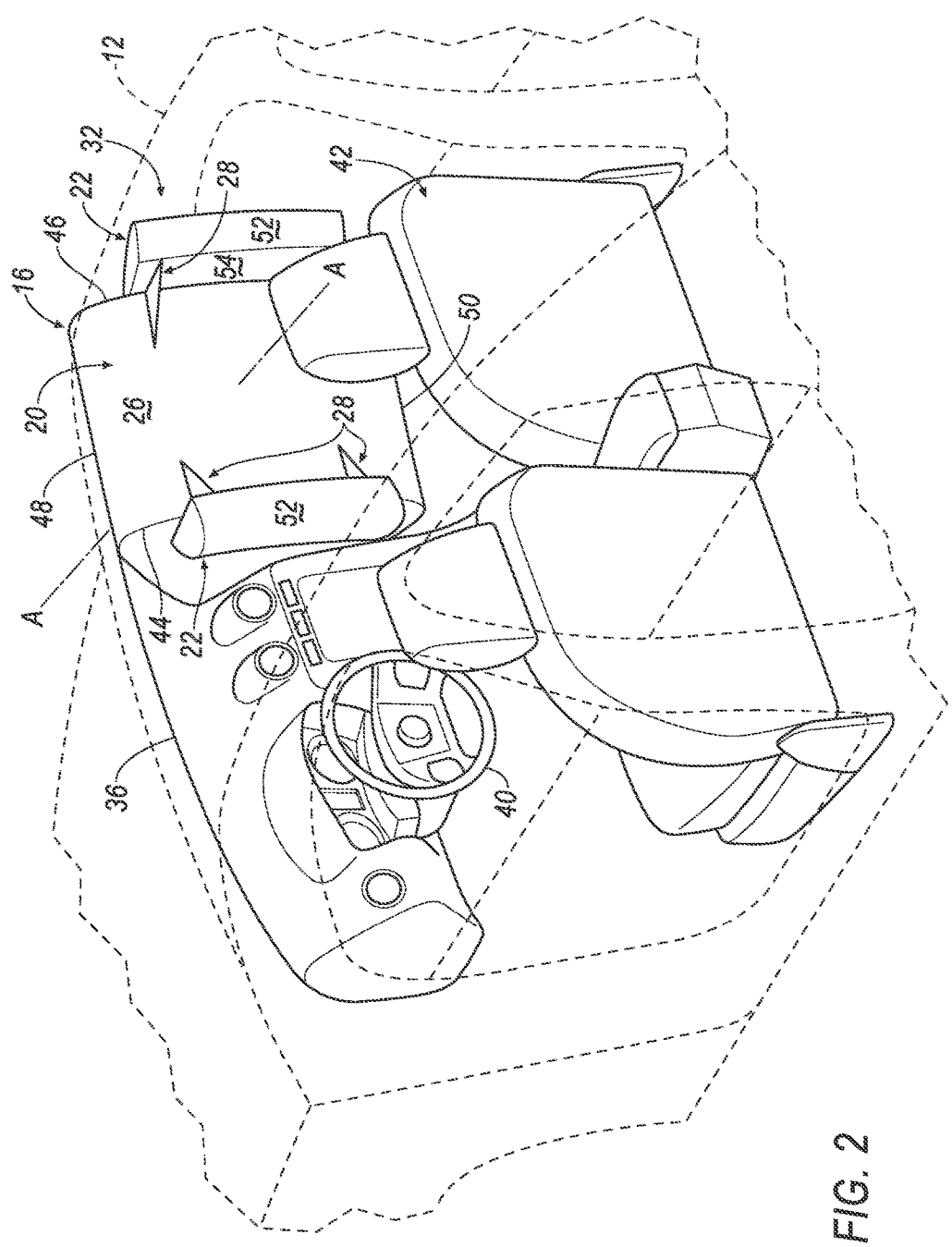
FIG. 2 is a perspective view of FIG. 1 including the airbag in an inflated position and including a panel, an extension extending transverse to the panel, and an external tether extending from the extension to an external surface of the panel.
Figure 6:
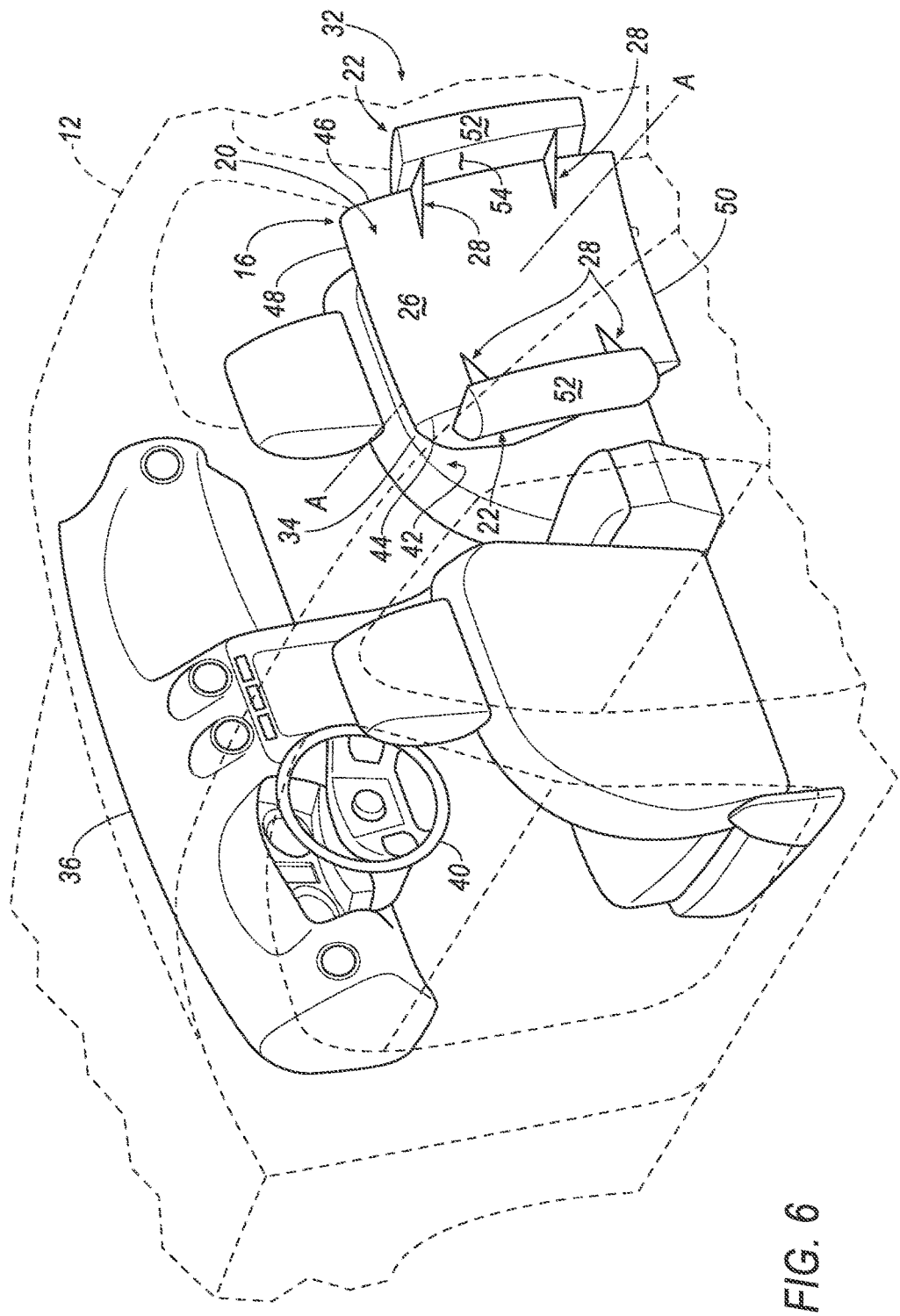
FIG. 6 is a perspective view of another embodiment of the airbag assembly supported by a seatback with the airbag in the inflated position.

As one example, the reaction surface 34 may be an instrument panel 36, as shown in FIGS. 1 and 2. Specifically, as shown in FIG. 1, the reaction surface 34 may be a frame beam 38 of the instrument panel 36. As another example, the reaction surface 34 may be a steering wheel 40. As another example, the reaction surface 34 may be a seatback 42 of a seat, e.g., a front seat, as shown in FIG. 6. The seatback 42 is on a front passenger seat in FIG. 6, but may alternatively be on any one or all of the seatbacks 42 of the vehicle 12. In these examples, the airbag 16 may be inflatable from the reaction surface 34 in a vehicle-rearward direction. In the alternative, the reaction surface 34 may be any suitable surface in the vehicle 12. The vehicle 12 may include any number of airbag assemblies 10 on any number of reaction surfaces.

As set forth above, the airbag assembly 10 is supported by the reaction surface 34. In other words, the airbag assembly 10 may be mounted directly to the reaction surface 34 or may be supported by the reaction surface 34 on one or more intermediate components. As one example, with reference to FIG. 1, the base 14 may be attached to the reaction surface 34, e.g. the frame beam 38 of the instrument panel 36.

The base 14 may house the airbag 16 in the uninflated position and may support the airbag 16 on the reaction surface 34 in the inflated position. The base 14 may, for example, include clips, panels, etc. for attaching to the airbag 16 and for attaching the airbag assembly 10 to the reaction surface 34.

The airbag 16 may be any suitable type of airbag 16. For example, the airbag 16 may be a front passenger airbag, as shown in FIG. 2. As another example, the airbag 16 may be a driver airbag, a seatback airbag, as shown in FIG. 6, or any other suitable type of airbag.

The airbag 16 may be a single continuous unit, e.g., a single piece of fabric. As another example, the airbag 16 may include a plurality of segments, i.e., two or more, that are separately formed and subsequently attached together. The segments may be attached to each other in any suitable fashion, e.g., stitching, ultrasonic welding, etc.

The airbag 16, i.e., the panels (including panel 20), extensions 22, etc., may be formed of any suitable type of material or materials. The airbag 16, for example, may be formed from a woven polymer. For example, the airbag 16 may be formed of woven nylon yarn, e.g., nylon 6. Other suitable examples include polyether ether ketone (PEEK), polyetherketoneketone (PEKK), polyester, or any other suitable polymer.

The airbag 16 may include a plurality of panels, including panel 20. Each of these panels may extend transverse to each other in the inflated position. When in the inflated position, the panel 20 faces an intended occupant, e.g., the occupant of the passenger seat of FIG. 2 and the occupant of the rear right seat of FIG. 6. The panel 20 is positioned to receive and be impacted by the occupant when the airbag assembly 10 is inflated during an impact that urges the occupant toward the airbag assembly 10. In other words, the panel 20 may be referred to as an "impact panel."

Figure 3:
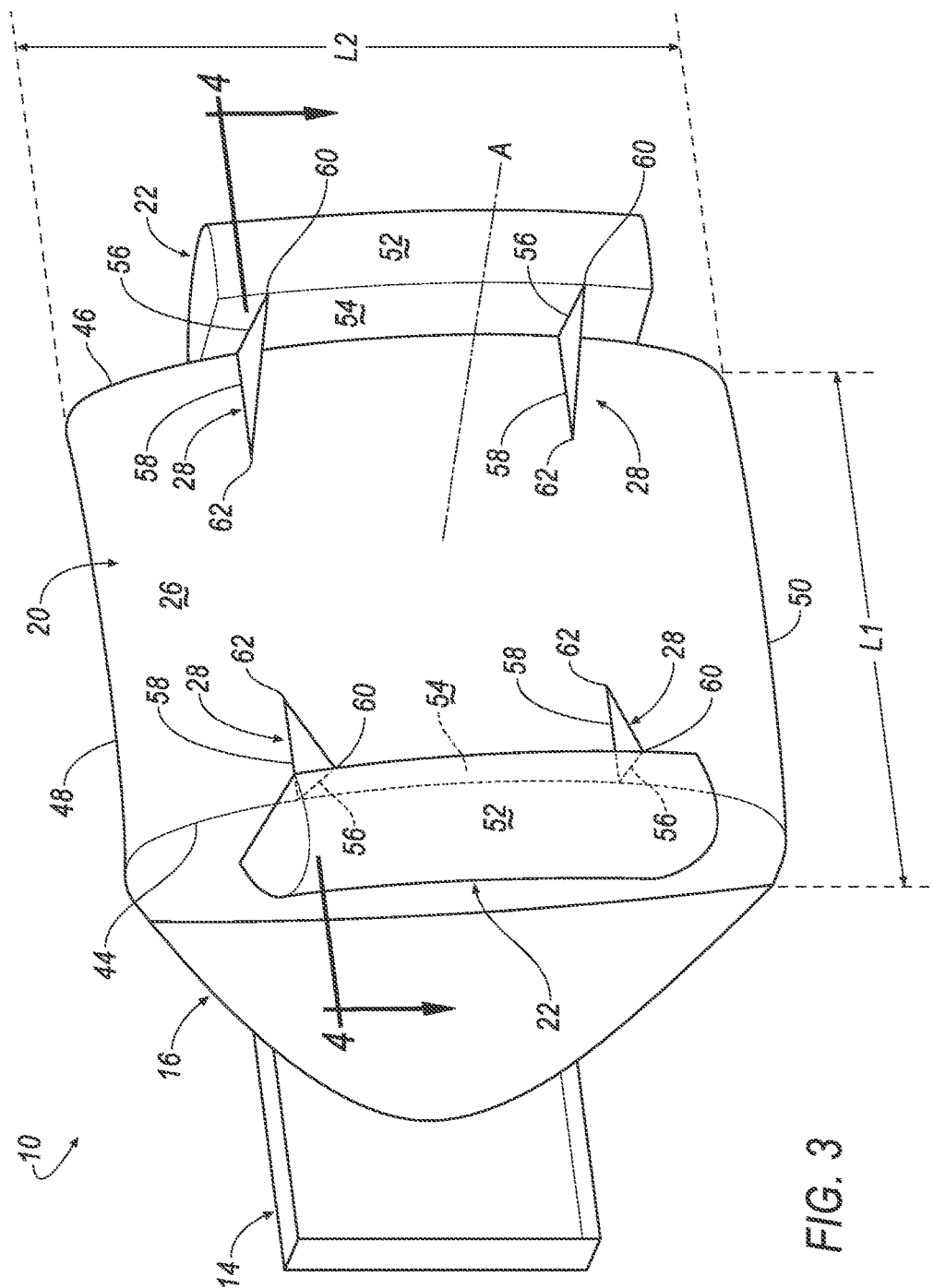
FIG. 3 is a perspective view of the airbag assembly with the airbag in the inflated position.

As set forth above, the airbag 16 may be inflatable from the uninflated position to the inflated position. With reference to FIG. 3, the panel 20 is spaced from the base 14 in the inflated position. For example, the panel 20 is adjacent to the occupant in the inflated position. During inflation, the airbag 16 may extend along an axis A in a direction away from the base 14, as shown in FIG. 3.

As shown in FIGS. 2 and 3, the panel 20 may extend generally in a plane P (identified in FIG. 4) transverse to the axis A. For example, the panel 20 may extend in a cross-vehicle direction. The panel 20 may extend to one or more ends 44, 46, 48, 50 spaced from the axis A and extending around the axis A. The panel 20 terminates at the ends 44, 46, 48, 50. For example, in the inflated position shown in FIG. 2, the panel 20 may include four ends 44, 46, 48, 50, i.e., is rectangular, including a first end 44, a second end 46 spaced from the first end 44, a top end 48 extending from the first end 44 to the second end 46, and a bottom end 50 spaced from the top end 48 and extending from the first end 44 to the second end 46. The top end 48 and the bottom end 50 may be of the same length L1, and the first end 44 and the second end 46 may be of the same length L2. As another example, the panel 20 may include one end encircling the axis A, i.e., may be circular.

Figure 4:
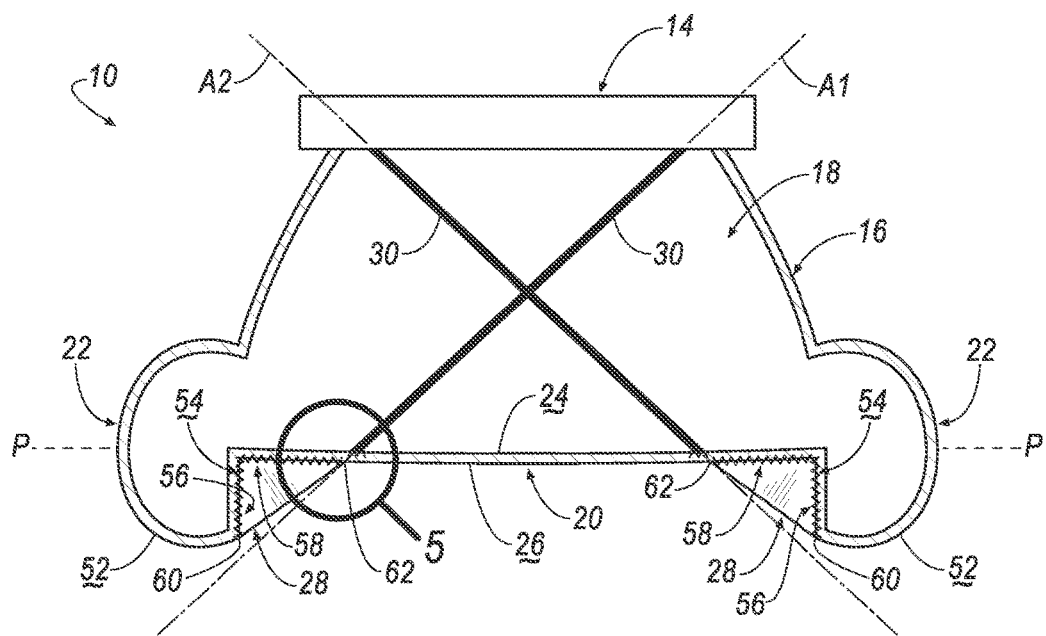
FIG. 4 is a cross-sectional view of the airbag assembly along line 4 in FIG. 3 with the airbag in the inflated position including the panel being sandwiched by the external tether and an internal tether extending from an internal surface of the panel to a base.

As shown in FIG. 4, the internal surface 24 of the panel 20 is disposed between the inflation chamber 18 and the external surface 26 of the panel 20. The internal surface 24 of the panel 20 may be in fluid communication with the inflation chamber 18. In other words, the internal surface 24 of the panel 20 may partially define the inflation chamber 18. For example, the internal surface 24 of the panel 20 may be pushed away from the base 14 along the axis A by gas flow in the inflation chamber 18 during inflation of the airbag 16.

With continued reference to FIG. 4, the external surface 26 is opposite the internal surface 24 on the panel 20. In other words, the external surface 26 of the panel 20 is spaced from the inflation chamber 18 by the internal surface 24. For example, the external surface 26 faces the occupant in the inflated position. The external surface 26 of the panel 20 may be impacted by the occupant during the vehicle impact.

The airbag 16 may include one or more extensions 22 disposed along the panel 20. The extensions 22 may, for example, be disposed at one or more ends 44, 46, 48, 50 of the panel 20, e.g., the first end 44 and the second end 46, as shown in FIGS. 2-6. The extensions 22 may be of identical construction, and common numerals are used herein to refer to common features of the plurality of extensions 22.

The extensions 22 may be elongated. For example, as shown in FIGS. 2 and 6, the extensions 22 may be elongated along the first end 44 and the second end 46 of the panel 20 in a direction from the top end 48 of the panel 20 to the bottom end 50 of the panel 20. For example, as shown in FIGS. 2 and 3, the extensions 22 may be elongated partially along the length L2 of the end 44, 46 of the panel 20. In other words, the extensions 22 may be less than, i.e., shorter, than the length L2 of the end 44, 46 of the panel 20. In this situation, the extensions 22 may be spaced from the top end 48 of the panel 20 and/or the bottom end 50 of the panel 20. Alternatively, the extensions 22 may be elongated entirely along the length L2 of the end 44, 46 of the panel 20. In other words, the extensions 22 may extend from the top end 48 of the panel 20 to the bottom end 50 of the panel 20.

The extensions 22 may match the contour of the end 44, 46 of the panel 20. In other words, the extensions 22 may contact the end 44, 46 of the panel 20 entirely along the extensions 22. For example, the extensions 22 may extend generally linear along the end 44, 46 of the panel 20, as shown in FIGS. 2 and 3. Alternatively, the extensions 22 may be curved about the axis A along the end 44, 46 of the panel 20.

With reference to FIG. 3, the extensions 22 may include a front surface 52 spaced from the panel 20 in the inflated position. For example, in the inflated position, the front surface 52 may extend further along the axis A further from the base 14 than does the panel 20. In other words, the front surface 52 may extend further in the vehicle-rearward direction than the panel 20. The front surface 52 may be adjacent the occupant in the inflated position.

With continued reference to FIG. 3, the extensions 22 may include a side surface 54 extending from the front surface 52 to the panel 20 in the inflated position. The side surface 54 may extend transverse, e.g., at a right angle, relative to the panel 20. A transition from the side surface 54 to the panel 20 may be angular or rounded.

The extensions 22 are in fluid communication with the inflation chamber 18. In other words, the inflation chamber 18 may extend into the extensions 22 in the inflated position. For example, the extensions 22 may be open to the inflation chamber 18, as shown in FIG. 4. Alternatively, for example, a vent (not shown) may be disposed in the inflation chamber 18 at the extensions 22 for controlling gas flow into the extensions 22.

The extensions 22 and the panels may be designed to encourage the extensions 22 to remain inflated when impacted by an occupant. For example, the extensions 22 and the panel 20 may be formed of different types of material. For example, the extensions 22 may be formed of a material that is less permeable than the material of the panel 20. In other words, the material of the extensions 22 may eliminate or reduce gas leakage as compared to the material of the panel 20. The material of the extensions 22, for example, may include a coating such as silicone, neoprene, urethane, polyorganosiloxane, etc., that the material of the panel 20 lacks. The coating inhibits gas leakage through the extensions 22. In this situation, both the extensions 22 and the panel 20 may be formed of the same or different type of woven polymer, as described above. Additionally, or alternatively to different material types, one or more of the panels of the airbag 16 may include vents to encourage the extensions 22 to remain inflated while the inflation chamber 18 vents when the panel 20 is impacted by the occupant.

The airbag assembly 10 may include one or more external tethers 28 disposed along the extensions 22, as shown in FIGS. 2, 3, and 6. The external tethers 28 may be disposed at various locations along the extensions 22, e.g., along the side surface 54 of the extensions 22. For example, the airbag assembly 10 may include two external tethers 28 spaced from each other along the side surface 54 of each extension 22. The external tethers 28 may be of identical construction, and common numerals are used herein to refer to common features on the plurality of external tethers 28. The external tethers 28 may be formed of the same or different material as the airbag 16.

With reference to FIG. 3, the external tethers 28 may include a first side 56 and a second side 58 intersecting the first side 56 at the transition between the extension 22 and the panel 20. The first side 56 of the external tethers 28 may extend from the external surface 26 of the panel 20 to an end 60 spaced from the panel 20 along the side surface 54 of the extension 22. The second side 58 of the external tethers 28 may extend from the extension 22 to an end 62 spaced from the extension 22 along the external surface 26 of the panel 20.

With continued reference to FIG. 3, the external tethers 28 may be triangular. In this situation, the first side 56 and the second side 58 may be the legs of the triangle. In other words, the external tethers 28 may include a third side (not numbered) extending from the end 62 of the second side 58 to the end 60 of the first side 56 obliquely inclined from the panel 20, i.e., the hypotenuse.

Figure 5:
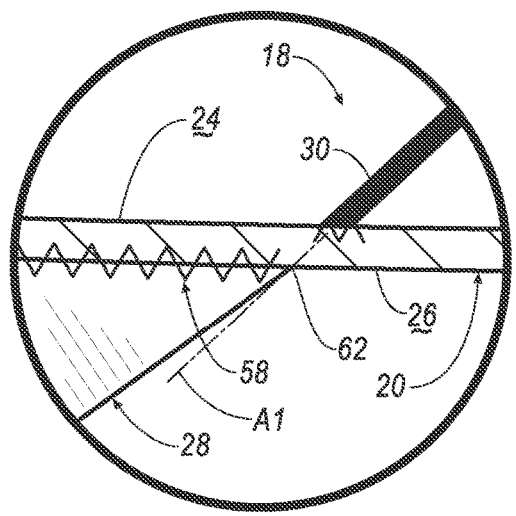
FIG. 5 is a magnified view of a portion of FIG. 4 showing the external tether sewn to the external surface of the panel, and a portion of the internal tether sewn to a portion of the internal surface of the panel.

The external tethers 28 may be connected to each of the external surface 26 of the panel 20 and the side surface 54 of the extension 22. In other words, the first side 56 of the external tethers 28 may be connected to the side surface 54 of the extension 22 and the second side 58 of the external tethers 28 may be connected to the external surface 26 of the panel 20. The first side 56 and the second side 58 of the external tethers 28 may be connected in a same or different manner to the side surface 54 of the extension 22 and external surface 26 of the panel 20, respectively. For example, the external tethers 28 may be connected to each of the external surface 26 of the panel 20 and the side surface 54 of the extension 22 by stitching, as shown in FIG. 5. Alternatively, the external tethers 28 may be connected to the external surface 26 of the panel 20 and the side surface 54 of the extension 22 by ultrasonic welding or any other suitable manner.

The airbag assembly 10 may include one or more internal tethers 30 extending from the base 14 to the internal surface 24 of the airbag 16. For example, the airbag 16 may include the same number of internal tethers 30 as external tethers 28. The internal tethers 30 may be of identical construction, and common numerals are used herein to refer to common features on the plurality of internal tethers 30. The internal tethers 30 may be formed of the same or different material type as the airbag 16.

As shown in FIG. 4, the internal tethers 30 may be disposed in the inflation chamber 18. As set forth above, the internal tethers 30 may extend across the inflation chamber 18 from the base 14 to the internal surface 24 of the panel 20. For example, the internal tethers 30 may extend diagonally across the inflation chamber 18 from the base 14 to the internal surface 24 of the panel 20. In other words, the internal tethers 30 may be inclined obliquely from each of the base 14 and the internal surface 24 of the panel 20. For example, as shown in FIG. 4, the airbag may include four internal tethers 30 and four external tethers 28. In this situation, one of the internal tethers 30 may extend along a first axis A1 that intersects one of the external tethers 28, and another of the internal tethers 30 may extend along a second axis A2 that crosses the first axis A1 and intersects another of the external tethers 28. Alternatively, the internal tethers 30 may extend directly across, i.e., at a right angle, the inflation chamber 18 from the base 14 to the internal surface 24 of the panel 20.

The internal tethers 30 may be connected to the internal surface 24 of the panel 20 in any suitable manner. For example, the internal tethers 30 may be connected to the internal surface 24 of the panel 20 by stitching, as shown in FIG. 5. Alternatively, the internal tethers 30 may be connected to the internal surface 24 of the panel 20 by ultrasonic welding or any other suitable manner.

The internal tethers 30 may be connected to the base 14 in a same or different manner as the airbag 16. The internal tethers 30 may be connected to the base 14 in any suitable manner. For example, the internal tethers 30 may be connected to the base 14 by clips, panels, or any other suitable manner, as set forth above.

The panel 20 may be sandwiched between the internal tethers 30 and the external tethers 28. Specifically, the panel 20 may be sandwiched between the end 62 of the second side 58 of the external tethers 28 and the internal tethers 30, as shown in FIG. 5. In other words, the internal tethers 30 and the end 62 of the second side 58 of the external tethers 28 each abut the panel 20 across from each other, i.e., on the internal surface 24 and the external surface 26, respectively.

The airbag assembly 10 may include an inflator 64 in fluid communication with the airbag 16 that inflates the airbag 16 from the uninflated position to the inflated position. The inflator 64 expands the airbag 16 with an inflation medium, such as a gas, to move the airbag 16 from the uninflated position to the inflated position. Specifically, the inflator 64 may be in communication with the inflation chamber 18 to supply the inflation medium to the inflation chamber 18. The inflator 64 may be supported in the base 14 of the airbag assembly 10, as shown in FIG. 1, or may be disposed in any other suitable location.

The inflator 64 may be, for example, a pyrotechnic inflator 64 that uses a chemical reaction to drive the inflation medium into the airbag 16. Alternatively, the inflator 64 may be, for example, a cold-gas inflator that, when activated, ignites a pyrotechnic charge that creates an opening for releasing the pressurized inflation medium to the airbag 16 via a fill tube 66. Alternatively, the inflator 64 may be of any suitable type, for example, a hybrid inflator.

Figure 7:
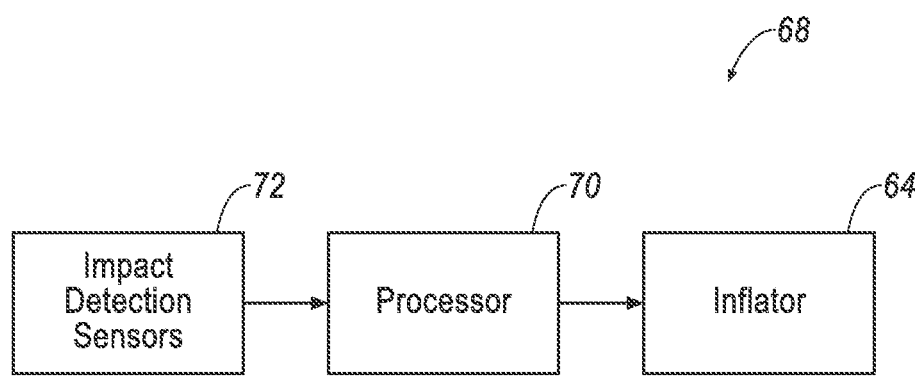
FIG. 7 is flowchart of an inflation system of the vehicle.

With reference to FIG. 7, the vehicle 12 may include an inflation system 68. The inflation system 68 includes a processor 70 programmed to initiate an inflation of the airbag 16 in response to the vehicle impact. The processor 70 may be embedded in a microcontroller. The microcontroller may include memory, etc. The memory of the microcontroller may store instructions executable by the processor 70 and the processor 70 may read the instructions from the memory and execute the instructions.

The vehicle 12 may include impact detection sensors 72 programmed to detect the vehicle impact to the vehicle 12. The impact detection sensors 72 may be disposed in the instrument panel 36 or elsewhere in the vehicle 12. The impact detection sensors 72 may be of various types, e.g., pressure sensor, acceleration sensor, vision sensor, etc. When the vehicle impact occurs, the processor 70 may receive one or more signals from the impact detection sensors 72 indicating the vehicle impact. In response to receiving the signals from the impact detection sensors 72, the processor 70 may initiate the inflation of the airbag 16.

Alternatively, the processor 70 may initiate the inflation of the airbag 16 selectively based on information from the impact detection sensors 72 identifying the physical characteristics of the vehicle impact, e.g., which side of the vehicle 12 impacted, amount of pressure applied to the vehicle 12, etc. and also seat occupancy information, e.g., by using the occupancy sensors disposed inside the seats sensing the occupancy status of the seats.

In order to receive the signals from the impact detection sensors 72 and to initiate the inflation of the airbag 16, the processor 70 communicates with the impact detection sensors 72 and the inflator 64, e.g., through a direct electrical wiring, through which an analog or a digital signal is transmitted, or through a communication network like CAN (Control Area Network), Ethernet, LIN (Local Interconnect Network) or any other way.

In operation, the airbag 16 is in the uninflated position, as shown in FIG. 1, under normal operating conditions of the vehicle 12. When the impact detection sensors 72 sense an impact of the vehicle 12, the processor 70 triggers the inflator 64 to inflate the airbag 16 with the inflation medium from the uninflated position to the inflated position. When the inflator 64 inflates the airbag 16 to the inflated position, as shown in FIGS. 2 and 3, the inflation medium flows to the inflation chamber 18 increasing the pressure in the inflation chamber 18. As the pressure is increased in the inflation chamber 18, the internal surface 24 of the panel 20 is pushed away from the base 14 along axis A to the inflated position, and the extension 22 is inflated to the inflated position. As the occupant moves within the vehicle 12 due to the momentum of the vehicle impact, the occupant may move towards the panel 20, i.e., the external surface 26 of the panel 20. When the occupant impacts the panel 20, the head of the occupant may slide or rotate towards one of the ends 44, 46 of the panel 20. In this situation, the head of the occupant may impact the extension 22, e.g., the side surface 54. The extension 22 may catch the head of the occupant to reduce sliding and/or rotating motion. In this situation, the external tether 28 and the internal tether 30 may each provide a counteracting force against the head of the occupant impacting the extensions 22 such that the extension 22 may retain the head of the occupant on the airbag 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
a base;
an airbag supported by the base and defining an inflation chamber;
the airbag including a panel including an internal surface facing the inflation chamber and an external surface facing away from the inflation chamber;
the airbag including an extension extending transverse to the panel, the extension being elongated along an axis;
an internal tether extending from the base to the internal surface of the panel; and
a first external tether and a second external tether each extending from the extension to the external surface of the panel, the first external tether and the second external tether being spaced from each other along the axis;
wherein the panel is sandwiched between the internal tether and the first external tether;
a second internal tether, and wherein the panel is sandwiched between the second internal tether and the second external tether;
a second extension spaced from the extension transverse to the axis;
a third internal tether and a fourth internal tether each extending from the base to the internal surface of the panel;
a third external tether and a fourth external tether each extending from the second extension to the external surface of the panel, the third external tether and the fourth external tether being spaced from each other along the axis;
wherein the panel is sandwiched between the third internal tether and the third external tether and between the fourth internal tether and the fourth external tether; and
wherein the first and second external tethers are spaced from the third and fourth external tethers transverse to the axis by an impact panel, the impact panel extending transverse to the axis from the first external tether to the third external tether and from the second external tether to the fourth external tether.

2. The airbag assembly according to claim 1, wherein the airbag is inflatable to an inflated position, the panel being spaced from the base in the inflated position.

3. The airbag assembly according to claim 1, wherein the inflation chamber is in fluid communication with the internal surface of the panel and the extension.

4. The airbag assembly according to claim 1, wherein the internal tether is disposed in the inflation chamber.

5. The airbag assembly according to claim 1, wherein the first and second external tethers and the internal tether are connected to the panel.

6. The airbag assembly according to claim 1, wherein the first external tether and the second external tether each include a first side connected to the extension and a second side connected to the external surface of the panel.

7. The airbag assembly according to claim 6, wherein the second side of each external tether extends along the external surface to an end spaced from the extension, and wherein the panel is sandwiched between the end of one of the first external tether and the second external tether and the internal tether.

8. The airbag assembly according to claim 1, wherein the extension is formed of a material that is less permeable than the material of the panel.

9. The airbag assembly of claim 1, wherein the internal tethers are spaced from the extension and the second extension.

10. The airbag assembly of claim 1, wherein the internal tether is aligned with the first external tether on the panel along the axis.

11. A restraint system comprising:
a reaction surface;
an airbag assembly supported by the reaction surface;
the airbag assembly including a base and an airbag supported by the base and defining an inflation chamber;
the airbag including a panel including an internal surface facing the inflation chamber and an external surface facing away from the inflation chamber;
the airbag including an extension extending transverse to the panel, the extension being elongated along an axis;
an internal tether extending from the base to the internal surface of the panel; and a first external tether and a second external tether each extending from the extension to the external surface of the panel, the first external tether and the second external tether being spaced from each other along the axis;

wherein the panel is sandwiched between the internal tether and the first external tether;

a second internal tether, and wherein the panel is sandwiched between the second internal tether and the second external tether;

a second extension spaced from the extension transverse to the axis;

a third internal tether and a fourth internal tether each extending from the base to the internal surface of the panel;

a third external tether and a fourth external tether each extending from the second extension to the external surface of the panel, the third external tether and the fourth external tether being spaced from each other along the axis;

wherein the panel is sandwiched between the third internal tether and the third external tether and between the fourth internal tether and the fourth external tether; and wherein the first and second external tethers are spaced from the third and fourth external tethers transverse to the axis by an impact panel, the impact panel extending transverse to the axis from the first external tether to the third external tether and from the second external tether to the fourth external tether.

12. The restraint system according to claim 11, wherein the airbag is inflatable to an inflated position, the panel being spaced from the base in the inflated position.

13. The restraint system according to claim 11, wherein the inflation chamber is in fluid communication with the internal surface of the panel and the extension.

14. The restraint system according to claim 11, wherein the internal tether is disposed in the inflation chamber.

15. The restraint system according to claim 11, wherein the first and second external tethers and the internal tether are connected to the panel.

16. The restraint system according to claim 11, wherein the reaction surface is an instrument panel.

* * * * *